A. KEAGY & M. SHIMER.
SPARK ARRESTER.
No. 2,588.
PATENTED APR. 29, 1842.
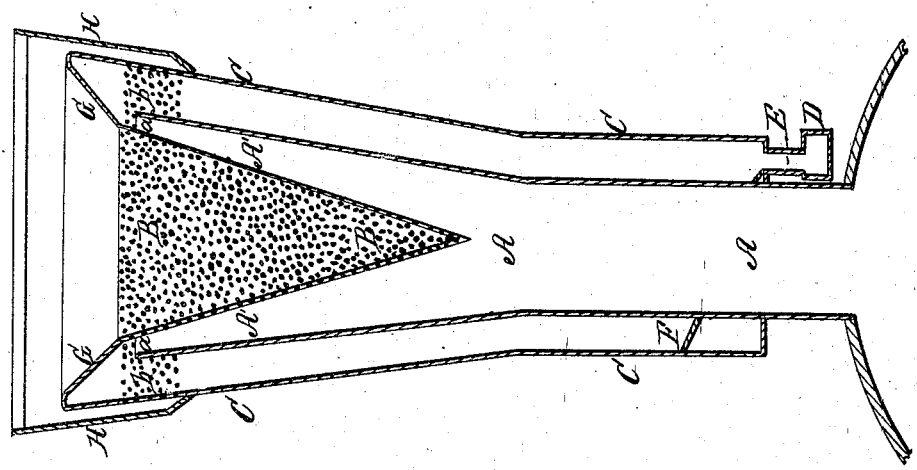

UNITED STATES PATENT OFFICE.

A. KEAGY AND MICHAEL SHIMER, JR., OF WOODBURY, PENNSYLVANIA.

SPARK-ARRESTER.

Specification of Letters Patent No. 2,588, dated April 29, 1842.

*To all whom it may concern:*

Be it known that we, ABRAHAM KEAGY and MICHAEL SHIMER, Jr., of Woodbury, in the county of Bedford and State of Pennsylvania, have invented a new and improved manner of constructing spark-arresters to be used on locomotives and other steam engines for the purpose of preventing the escape of sparks from the chimneys thereof; and we do hereby declare that the following is a full and exact description thereof.

In the accompanying drawing, A, A, represents the chimney of a locomotive steam engine, which is made to flare out toward its upper end, as shown at A′, A′, and within this upper, or flaring part, descends an inverted cone B, B, of perforated sheet metal, or of woven wire, the former being preferred. This perforated cone we have made about three feet in height, and about two feet in diameter at its upper perforated portion.

C, C, is the outer case, between which and the chimney the sparks and ashes are to fall; there being a receptacle at D, into which they descend through a tube E, there being an inclined plate, as at F, directing them toward said tube. The cone B, B, and the outer case, are joined together at their upper ends by a continuous metal rim G, G. There is a space at a, a, around the cone, where the flared part of the chimney terminates, of about one inch; and between this and the outer case, as at b, b, there is a space of about three inches. At the part b, b, there is a zone of perforations, two or three inches wide, through the outer case; and this zone is surrounded by a continuous rim H, H, attached to the outer case below the perforations at b, b, and extending three or four inches, more or less, above the case C, C; between the rim H, H, and the outer case there may be a space of about an inch, which will give a diameter of nearly three feet to the extreme upper end of the instrument.

The action of the arrester will be as follows: The exhaust steam being directed up the chimney in the ordinary manner, the larger portion of the draft will escape through the perforations in the cone B, B, while the sparks will pass up on the outside thereof, and when they arrive at the upper edge of the chimney, there being an additional escape through the perforated part of the outer case at b, b, the sparks and ashes will be directed toward these perforations, whence they will fall into the space between the chimney and the outer case, and will be deposited in the receptacle D, as in many other spark arresters.

Having thus fully described the manner in which we construct our improved spark arrester, and likewise shown the operation thereof, we do hereby declare that we do not make any claim to either of the parts which we have described, taken individually, the whole of them having been used under various modifications in other instruments for the same purpose; but—

What we do claim as constituting our invention, and desire to secure by Letters Patent, is—

The particular manner in which we have combined and arranged these parts as above set forth; that is to say, we claim, in combination, the employement of the perforated cone B, B, and of the perforated zone through the outer case C, C, the said cone and outer case being connected together by the curved rim G, G; the upper end of the chimney terminating in the region of the perforated zone; and this zone being surrounded by a rim H, H; the whole combination and arrangement being substantially the same with that herein set forth and made known.

ABRAHAM KEAGY.
MICHAEL SHIMER, JR.

Witnesses:
THOS. P. JONES,
E. L. BRUNDAGE.